United States Patent [19]
Shimaya et al.

[11] Patent Number: 5,512,019
[45] Date of Patent: Apr. 30, 1996

[54] OIL TENSIONER WITH SCREW GROOVE ON A SLIDING SURFACE

[75] Inventors: Kazuhiko Shimaya, Hidaka; Yuichi Futami, Iruma, both of Japan

[73] Assignee: Tsubakimoto Chain Co., Osaka, Japan

[21] Appl. No.: 415,506

[22] Filed: Apr. 3, 1995

[30]     Foreign Application Priority Data

Apr. 12, 1994 [JP] Japan ................................ 6-097003

[51] Int. Cl.⁶ .................................................... F16H 7/12
[52] U.S. Cl. ............................................................ 474/110
[58] Field of Search ................................ 474/110, 101, 474/273

[56]     References Cited

U.S. PATENT DOCUMENTS

| | | | |
|---|---|---|---|
| 4,822,320 | 4/1989 | Suzuki | 474/111 |
| 4,874,352 | 10/1989 | Suzuki | 474/110 |
| 4,881,927 | 11/1989 | Suzuki | 474/110 |
| 5,073,150 | 12/1991 | Shimaya | 474/110 |
| 5,087,225 | 2/1992 | Futami et al. | 474/110 X |
| 5,259,820 | 11/1993 | Mott | 474/110 |
| 5,277,664 | 1/1994 | Mott | 474/110 |

*Primary Examiner*—Roger J. Schoeppel
*Attorney, Agent, or Firm*—Armstrong, Westerman, Hattori, McLeland & Naughton

[57]     ABSTRACT

An oil tensioner includes a housing, forming a cylindrical bore therewithin, and a hollow cylindrical plunger. The housing and the plunger form an oil chamber therebetween, to which oil is supplied. The plunger is urged by a spring as well as external oil hydraulics. The plunger includes a screw groove, in communication with the oil chamber, formed on a sliding surface thereof abutting an inner surface of the housing. When the plunger is urged rearward, oil in the oil chamber flows gradually through the screw groove, thereby effectively lubricating the sliding surface therebetween.

3 Claims, 3 Drawing Sheets

OIL TENSIONER WITH SCREW GROOVE ON A SLIDING SURFACE

BACKGROUND OF THE INVENTION

The present invention relates to an oil tensioner, wherein oil is contained in an oil chamber which is formed by a housing and a plunger therebetween.

FIG. 6 shows a sectional view of a conventional oil tensioner. As shown in FIG. 6, such a tensioner 50 includes a housing 54, having an aperture therewithin, and a plunger 56, slidably reciprocating within the aperture, wherein oil is contained in an oil chamber 60 which is formed within the aperture by a housing 54 and a plunger 56 therebetween. The plunger 56 is biased by external oil hydraulics and spring 62, which in turn gives power transmission members, such as chain and belt, tensile strength.

In such a tensioner 50, it has been thought of as preferable to make a sliding surface between the housing 54 and the plunger 56 a mirror finished surface in order that the plunger 56 to smoothly slide therebetween.

However, it has been discovered that as the sliding distance of the plunger 56 with respect to the housing 54, or displacement of the plunger 56 while the tensioner 50 is operating, gets very little, face pressure between the housing 54 and the plunger 56 becomes larger, thereby causing a seizure phenomenon in case of working a mirror finished surface on the sliding surface thereof.

SUMMARY OF THE INVENTION

In view of the foregoing problems inherent of the known type of an oil tensioner now present in the prior art, the present invention provides an oil tensioner comprises a housing, a plunger slidably reciprocating with respect to the housing, an oil chamber for oil to be supplied, formed by the housing and the plunger therebetween, wherein the plunger comprises a screw groove, in communication with the oil chamber, formed on a sliding surface thereof abutting an inner surface of the housing, or the housing comprises a screw groove formed on a sliding surface thereof abutting an outer surface of the plunger.

Constructed as described above, according to the present invention, the plunger is biased backwardly while the tensioner is operating. Oil is supplied, through the screw groove, to the sliding surface between the plunger and the housing. The supplied oil serves as a lubricant, preventing seizure on the sliding surface between the housing and the plunger.

DETAILED DESCRIPTION OF THE PREFERRED EMBODIMENT

Preferred embodiments of the present invention will now be described, in detail, with reference to the accompanying drawings.

Figure 1:
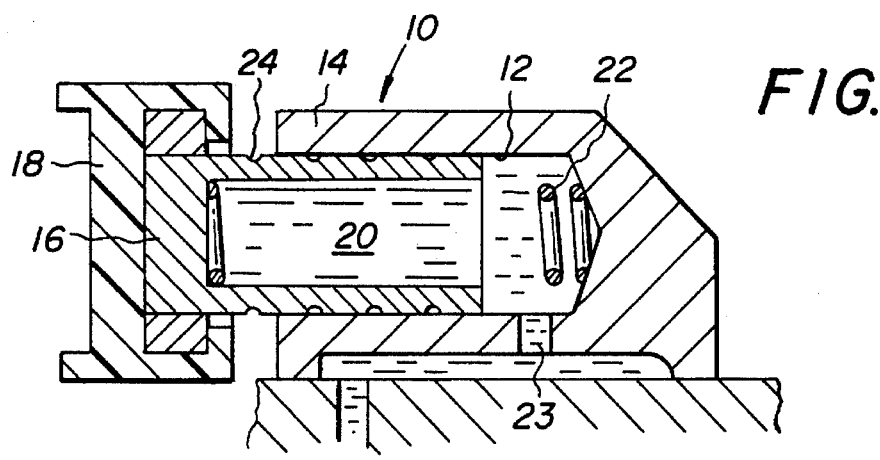
FIG. 1 shows a sectional view of the first embodiment of the tensioner according to the present invention.
Figure 1A:
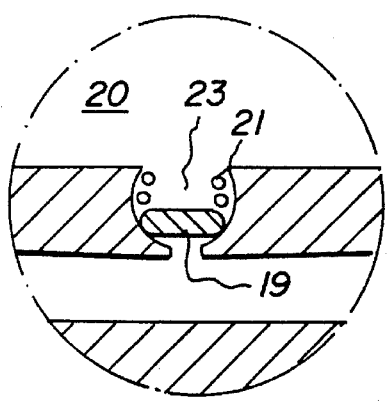
FIG. 1A shows a modification of the first embodiment.
Figure 2:
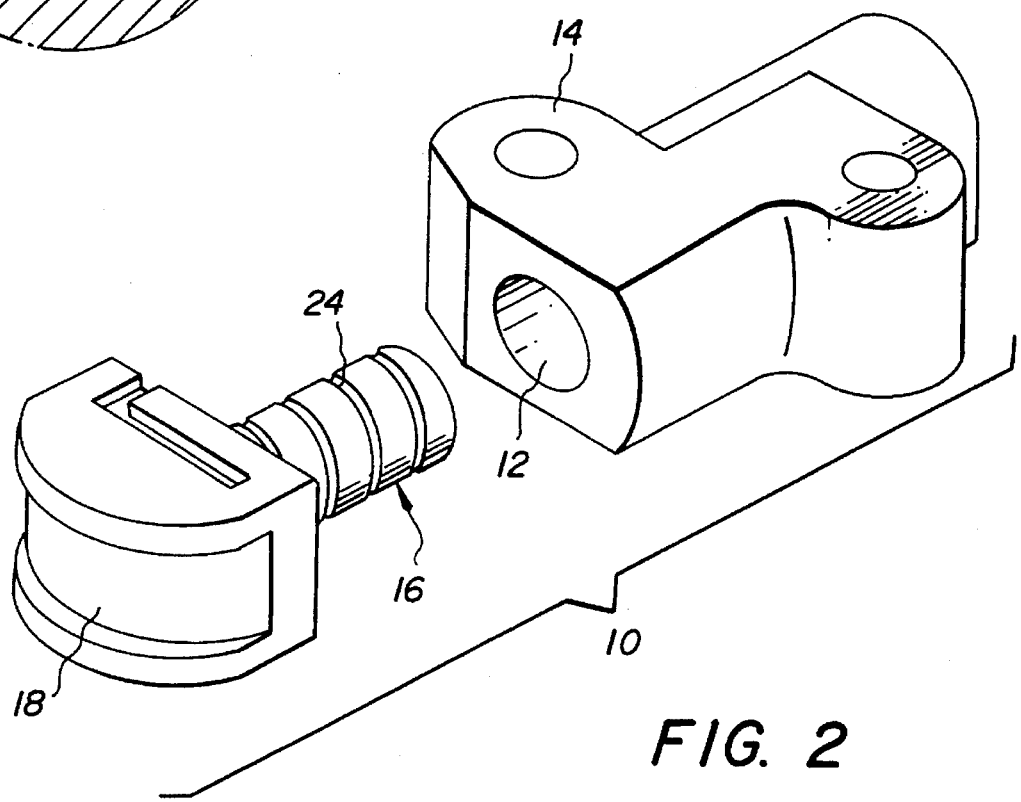
FIG. 2 shows an exploded perspective view of the oil tensioner of FIG. 1.

FIG. 1 and FIG. 2 show the first embodiment of oil tensioner according to the present invention. An oil tensioner 10 includes a housing 14, forming a cylindrical bottomed bore 12 therewithin, and a hollow cylindrical plunger 16, fixing a shoe 18 at the tip thereof. The housing 14 and the plunger 16 form an oil chamber 20 therebetween, to which oil is supplied through passage 23. The plunger 16 is urged by a spring 22 as well as external oil hydraulics. It is noted that the spring 22 is not necessarily mounted, but a check valve 19, 21, FIG. 1A. may be mounted instead in passage 23. The plunger 16 comprises a screw groove 24, in communication with the oil chamber 20, formed on a sliding surface thereof abutting an inner surface of the housing 14. Thus, when the plunger 16 is urged rearward (in a left direction as viewed in FIG. 1), oil in the oil chamber 20 flows gradually through the screw groove 24, thereby effectively lubricating the sliding surface therebetween. Because the screw groove 24 is formed spirally, large amount of oil does not flow out rapidly.

It is preferable that the depth of the screw groove 24 be less than ten times as deep as mean roughness at ten points (Rz: Japanese Industrial Standard B 0601) of the external surface of the plunger 16, and more preferably 2 to 5 times. Normally, the external surface of the plunger 16 is polished from 2–5μ of Rz. The plunger 16 of this embodiment is formed so that the depth of the screw groove 24 is 15 to 25μ.

It is preferable that the width of the screw groove 24 be less than 5,000 times as that of Rz, and more preferably 1,000 times more or less. The plunger 16 of this embodiment is formed so that the width of the screw groove 24 is 1 mm.

It is preferable that the pitch of the screw groove 24 be less than 5 times as long as that of metric coarse screw thread (JIS B 0205), and more preferably 2 to 3 times.

It is possible to supply oil from the oil chamber 20 to the sliding surface between the plunger 16 and the housing 14, by roughly finishing the entire sliding surface, however, it is very difficult to evenly finish the roughness thereof. According to the present invention, to simply form the screw groove 24 is enough, and it is easy to form it in addition to the present plunger 16.

Figure 3:
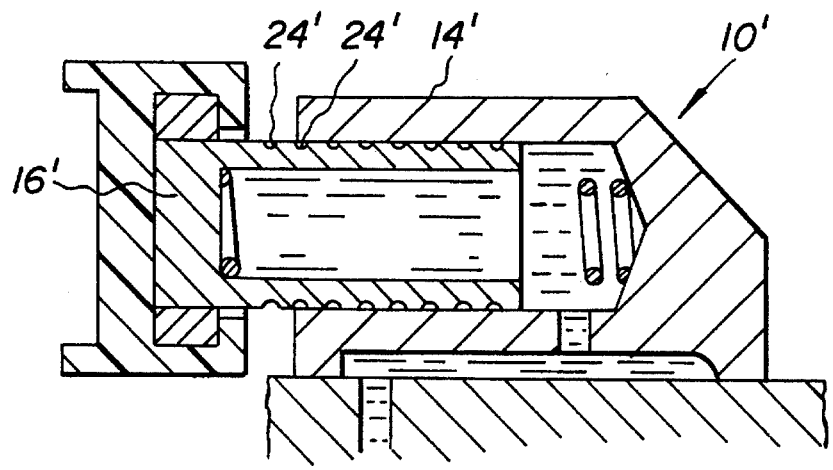
FIG. 3 shows a sectional view of the second embodiment of the tensioner according to the present invention.
Figure 4:
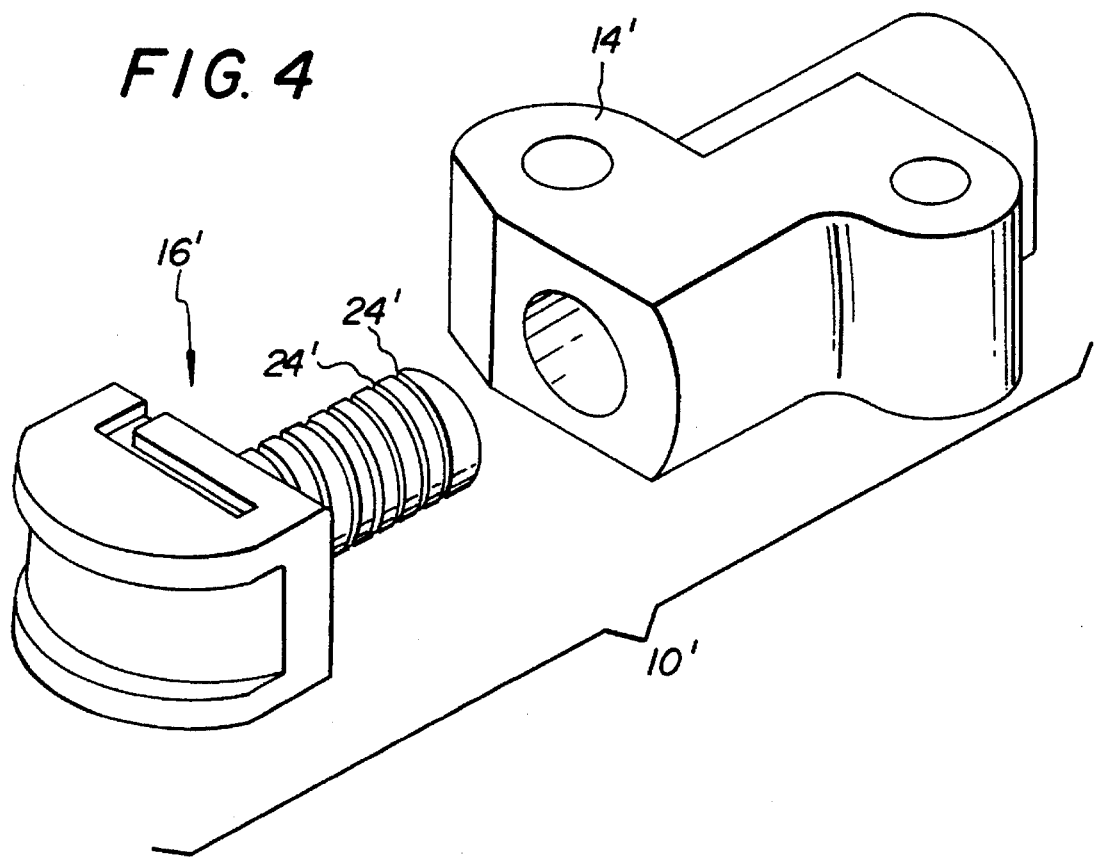
FIG. 4 shows an exploded perspective view of the oil tensioner of FIG. 3.

FIG. 3 and FIG. 4 show the second embodiment of the oil tensioner according to the present invention. The oil tensioner 10' of this embodiment is basically constituted as the same manner as that of the first embodiment, except that the oil tensioner 10' includes two screw grooves 24', 24' thereby lubricating the sliding surface between the plunger 16 and the housing 14 more evenly and effectively preventing seizure therebetween.

Figure 5:
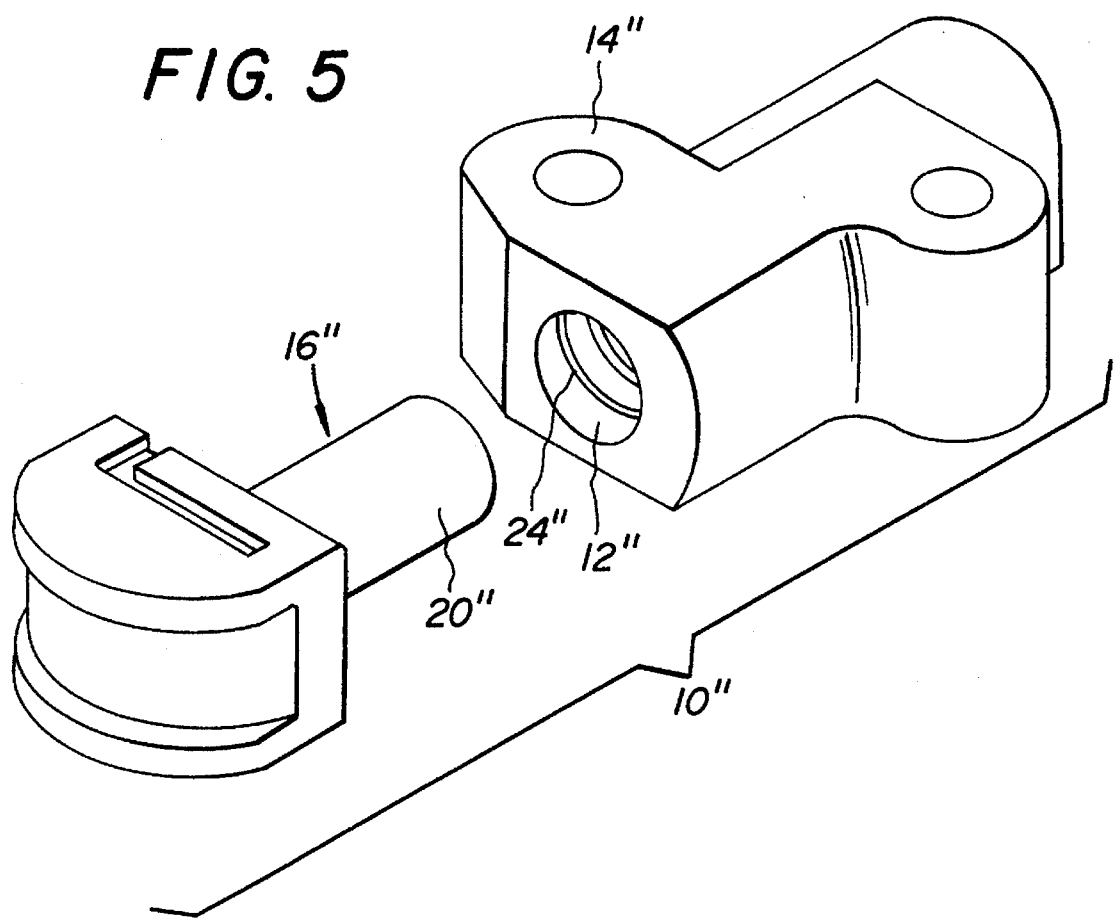
FIG. 5 shows an exploded perspective view of the third embodiment of the oil tensioner according to the present invention.
Figure 6:
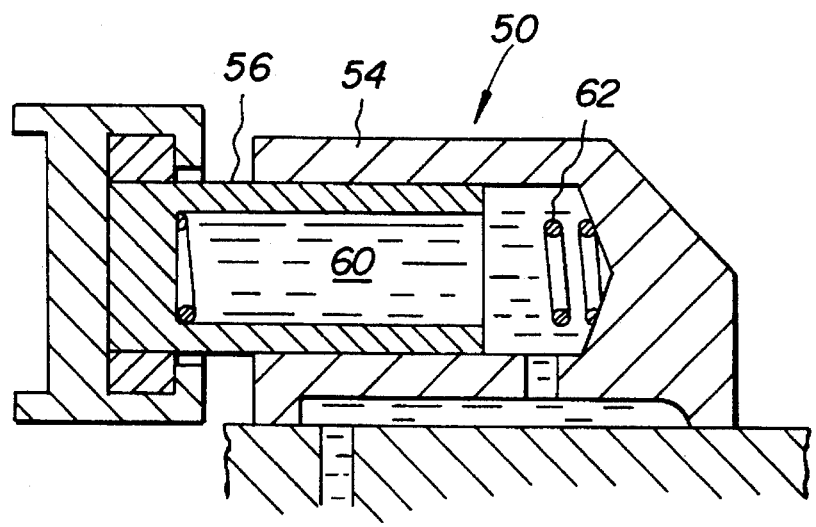
FIG. 6 shows a sectional view of the conventional oil tensioner.

FIG. 5 shows the third embodiment of the oil tensioner according to the present invention. The oil tensioner 10" of this embodiment includes a screw groove 24', formed on a cylindrical interior surface of the housing 14, at the sliding surface between the housing 14" and the plunger 16". The screw groove 24", elongated between one end of the bore 12 to the other end thereof, is in communication with the outside. Oil in the oil chamber 20" flows gradually through the screw groove 24", thereby effectively lubricating the sliding surface between the housing 14" and the plunger 16".

As will be understood from the foregoing description, according to the present invention, when the plunger is biased backwardly while the tensioner is operating, oil is supplied, through the screw groove, to the sliding surface between the plunger and the housing, so that oil lubricates the sliding surface and prevents seizure thereof.

Further, the screw groove enables the sliding surface to be evenly lubricated. Furthermore, oil can stay longer on the sliding surface due to fluidized resistance caused by the screw groove, thereby preventing such a large amount of oil as injures the function of the tensioner from flowing out.

The terms and expressions which have been employed herein are used as terms of description and not of limitation, and there is no intent, in the use of such terms and expressions, of excluding any of the equivalents of the features shown and described or portions thereof, but it is recognized that various modifications are possible within the scope of the invention claimed.

What is claimed is:

1. An oil tensioner comprising:

a housing with a cylindrical bottomed bore having a side wall surface and a bottom surface;

an approximately cylindrical plunger means having an outer peripheral smooth surface into which a helical groove has been formed, said plunger means for sliding reciprocation with respect to the cylindrical bottomed bore of the housing; and an oil chamber means within the cylindrical plunger defined between the housing and the plunger means for supplying oil to the helical groove and to an area between the outer peripheral surface of the plunger means and the sidewalls of the cylindrical bottomed bore in order to form a lubricating oil surface between the housing and the plunger means, said helical groove preventing a seizure phenomenon.

2. An oil tensioner, comprising:

a housing including a bore defined by a smooth cylindrical side wall surface and a bottom surface; and a hollow cylindrical plunger means for slidably reciprocating within the bore in the housing, said plunger means having an smooth outer peripheral surface into which a helical groove has been formed and a smooth inner peripheral surface defining an oil chamber means for supplying oil to the helical groove and to an area between the outer peripheral surface of the plunger and the sidewalls of the cylindrical bottomed bore in order to provide a lubricating oil surface between the housing and the plunger without seizure.

3. An oil tensioner, comprising:

a housing including a bore having a bottom surface and a smooth cylindrical sidewall surface into which a helical groove has been formed;

a plunger means for slidably reciprocating within the bore in the housing wherein the plunger means includes an smooth outer peripheral surface and oil chamber means for supplying oil to the helical groove in the sidewall surface of the housing and to an area between the sidewall surface of the housing and the outer peripheral surface of said plunger in order to provide a lubricating oil surface between the housing and the plunger, said helical groove preventing a seizure phenomenon.

\* \* \* \* \*